United States Patent
Ueki (10) Patent No.: US 11,875,212 B2
(45) Date of Patent: Jan. 16, 2024

(54) RFID TAG

(71) Applicant: Murata Manufacturing Co., Ltd., Nagaokakyo (JP)

(72) Inventor: Noriyuki Ueki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 126 days.

(21) Appl. No.: 17/659,085

(22) Filed: Apr. 13, 2022

(65) Prior Publication Data

US 2022/0237428 A1     Jul. 28, 2022

Related U.S. Application Data

(63) Continuation of application No. PCT/JP2020/031307, filed on Aug. 19, 2020.

(30) Foreign Application Priority Data

Jan. 29, 2020    (JP) ................. 2020-012662

(51) Int. Cl.
    *G06K 19/07*       (2006.01)
    *G06K 19/077*      (2006.01)
    *H01Q 1/22*        (2006.01)
    *H01Q 1/38*        (2006.01)

(52) U.S. Cl.
    CPC .  *G06K 19/07771* (2013.01); *G06K 19/07747* (2013.01); *G06K 19/07786* (2013.01); *H01Q 1/2225* (2013.01); *H01Q 1/38* (2013.01)

(58) Field of Classification Search
CPC ....... G06K 19/07771; G06K 19/07747; G06K 19/07786; H01Q 1/2225; H01Q 1/38
USPC ........................................................ 235/492
See application file for complete search history.

(56) References Cited

U.S. PATENT DOCUMENTS

| | | |
|---|---|---|
| 2011/0080331 A1 | 4/2011 | Kato |
| 2014/0253404 A1 | 9/2014 | Ikemoto et al. |
| 2017/0083804 A1 | 3/2017 | Kato et al. |
| 2018/0114104 A1 | 4/2018 | Kato et al. |

FOREIGN PATENT DOCUMENTS

| | | |
|---|---|---|
| JP | 2001188890 A | 7/2001 |
| JP | 2011076567 A | 4/2011 |
| WO | 2013115158 A1 | 8/2013 |
| WO | 2016084658 A1 | 6/2016 |

OTHER PUBLICATIONS

International Search Report issued for PCT/JP2020/031307 dated Oct. 27, 2020.

*Primary Examiner* — Daniel A Hess
(74) *Attorney, Agent, or Firm* — ArentFox Schiff LLP (57) ABSTRACT

An RFID tag is provided that includes an insulator film, an antenna with an antenna conductor pattern disposed on the insulator film, and an RFIC module mounted on the insulator film. The RFIC module includes an RFIC and an impedance matching circuit. The impedance matching circuit includes a first coil and a second coil. Main planes of magnetic flux loops generated in the vicinities of the first coil and the second coil by the antenna are not parallel to main planes of magnetic flux loops generated in the first coil and the second coil.

20 Claims, 5 Drawing Sheets

FIG. 5

RFID TAG

CROSS REFERENCE TO RELATED APPLICATIONS

The present application is a continuation of PCT/JP2020/031307 filed Aug. 19, 2020, which claims priority to Japanese Patent Application No. 2020-012662, filed Jan. 29, 2020, the entire contents of each of which are incorporated herein by reference.

TECHNICAL FIELD

The present invention relates to a radio frequency identifier (RFID) tag including a radio frequency integrated circuit (RFIC) and an antenna.

BACKGROUND

International Publication No. 2016/084658 (hereinafter "Patent Literature 1") discloses an example of an RFID tag including an RFIC module. This RFID tag is configured by mounting an RFIC module on an antenna base material on which an antenna is formed. The RFIC module includes an RFIC and an impedance matching circuit that matches impedance between the RFIC and the antenna.

In the RFIC module having the structure described in Patent Literature 1, depending on arrangement of a plurality of coils constituting the impedance matching circuit, unnecessary coupling between the coils and the antenna may occur. When this unnecessary coupling occurs, the RFIC module and the antenna cannot be independently designed, and the design of the entire RFID tag becomes complicated.

SUMMARY OF THE INVENTION

Therefore, it is an object of the present invention to provide an RFID tag in which unnecessary coupling between an antenna and a coil forming an impedance matching circuit of an RFIC module is suppressed to improve independence between the RFIC module and the antenna.

Accordingly, in an exemplary embodiment, an RFID tag is provided that includes an RFIC, an antenna, and an impedance matching circuit that matches impedance between the RFIC and the antenna. The impedance matching circuit includes a coil, and is connected between the RFIC and the antenna. A main plane of a magnetic flux loop generated in the vicinity of the coil by the antenna is not parallel to a main plane of a magnetic flux loop generated in the coil.

According to the e International Publication No. 2016/084658lary embodiments of the present invention, an RFID tag is provided in which unnecessary coupling between an antenna and a coil forming an impedance matching circuit of an RFIC module is suppressed to improve independence between the RFIC module and the antenna.

DETAILED DESCRIPTION OF EMBODIMENTS

Hereinafter, a plurality of exemplary aspects of the present invention will be shown with examples with reference to the drawings. In each figure, the same parts are designated by the same reference signs. In consideration of the description of the main points or ease of understanding, the embodiment is divided into a plurality of exemplary embodiments for convenience of description, but partial replacement or combination of configurations shown in different embodiments is possible. In second and subsequent embodiments, description of matters common to a first embodiment will be omitted, and only different points will be described. In particular, similar actions and effects obtained by the same configuration will not be sequentially described for each embodiment.

First Exemplary Embodiment

Figure 1:
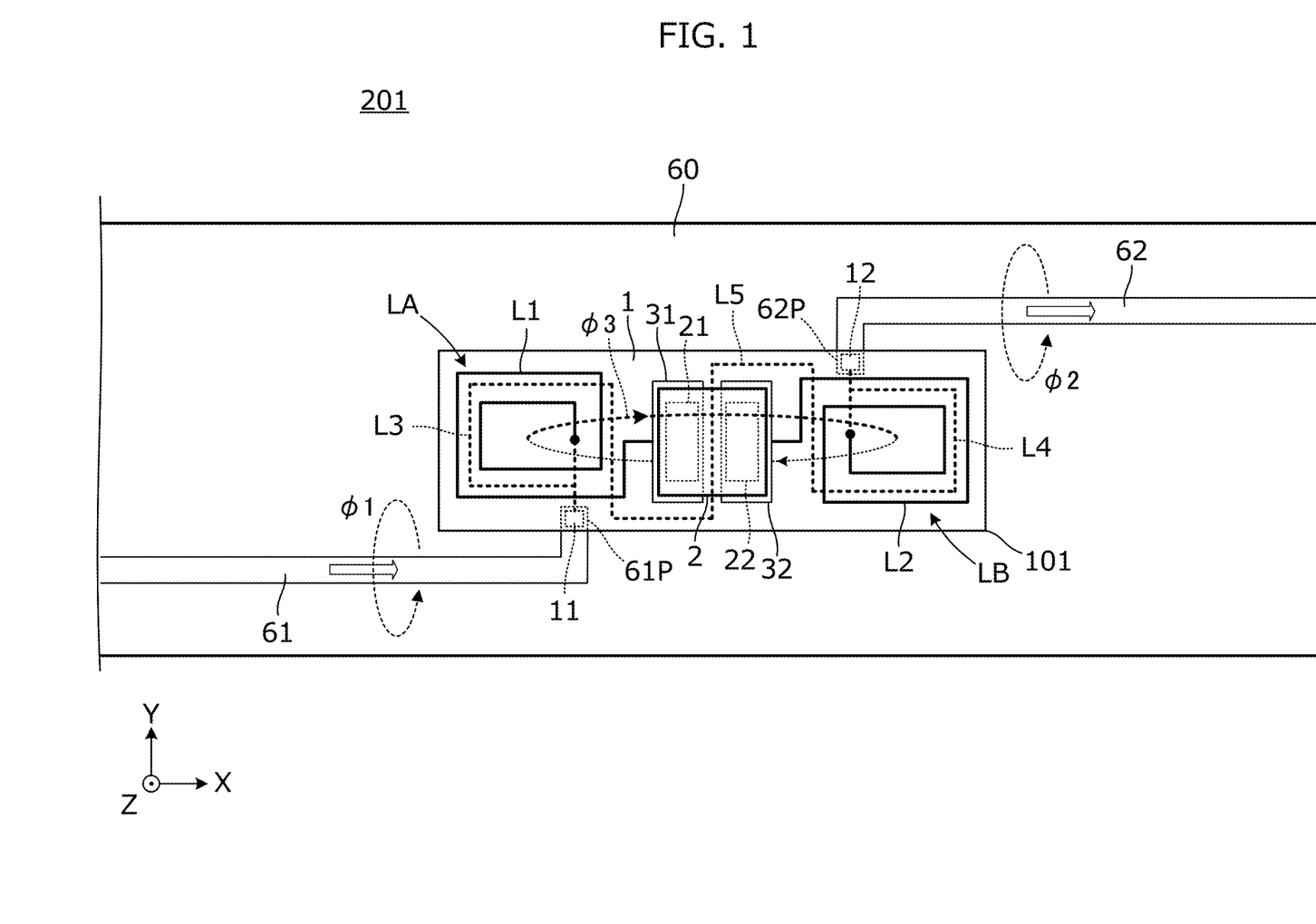
FIG. 1 is a partially enlarged plan view of an RFID tag 201 according to a first exemplary embodiment.

FIG. 1 is a partially enlarged plan view of an RFID tag 201 according to the first exemplary embodiment. The RFID tag 201 includes an insulator film 60, antenna conductor patterns 61 and 62 formed (or otherwise disposed) on the insulator film 60, and an RFIC module 101 mounted on the insulator film 60.

In an exemplary aspect, the antenna conductor patterns 61 and 62 form a dipole antenna. In FIG. 1, the vicinities of feeding units of the dipole antenna by the antenna conductor patterns 61 and 62 appear. A conductor pattern 61P is a feeding unit (e.g., a feeding end) of the antenna conductor pattern 61, and a conductor pattern 62P is a feeding unit (e.g., a feeding end) of the antenna conductor pattern 62.

The RFIC module 101 includes a substrate 1, an RFIC 2 mounted on the substrate 1, and an impedance matching circuit formed on the substrate 1 and matching impedance between the RFIC 2 and an antenna.

The impedance matching circuit includes a first inductor L1, a second inductor L2, a third inductor L3, a fourth inductor L4, and a fifth inductor L5.

According to an exemplary aspect, the insulator film 60 is, for example, a polyethylene terephthalate (PET) film, and the antenna conductor patterns 61 and 62 are, for example, patterns of aluminum foil.

In the RFIC module 101, an RFIC-side first terminal electrode 31, an RFIC-side second terminal electrode 32, an antenna-side first terminal electrode 11, and an antenna-side second terminal electrode 12 are formed.

When the RFIC module 101 is mounted on the insulator film 60, the antenna-side first terminal electrode 11 of the RFIC module 101 is connected to the conductor pattern 61P, and the antenna-side second terminal electrode 12 of the RFIC module 101 is connected to the conductor pattern 62P.

Figure 2:
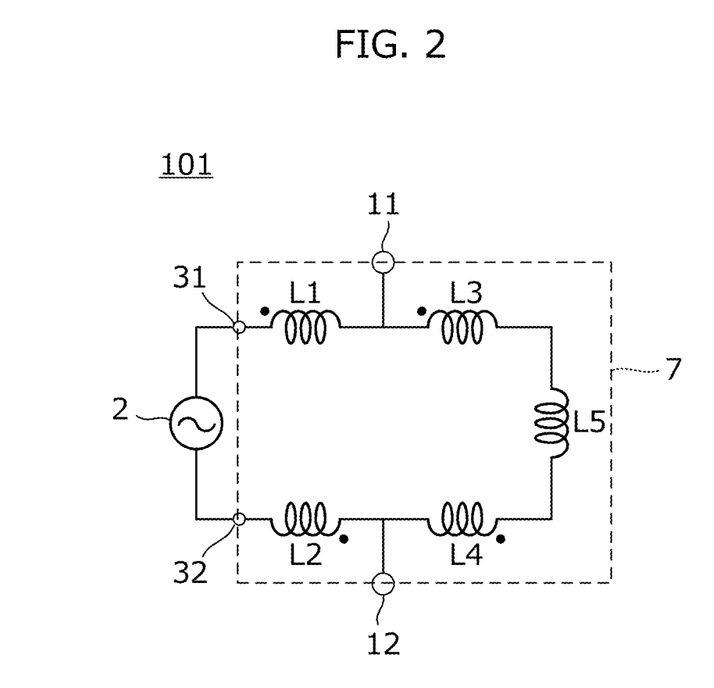
FIG. 2 is a circuit diagram of an RFIC module 101.

FIG. 2 is a circuit diagram of the RFIC module 101. The RFIC module 101 includes the RFIC 2 and an impedance matching circuit 7. The impedance matching circuit 7 includes the first inductor L1, the second inductor L2, the third inductor L3, the fourth inductor L4, and the fifth inductor L5. For purposes of this disclosure, a dot symbol in FIG. 2 indicates a coil winding direction of each inductor.

Moreover, each of the first inductor L1, the second inductor L2, the third inductor L3, and the fourth inductor L4 illustrated in FIG. 1 includes a spiral coil conductor pattern. A coil opening of the coil conductor pattern forming the first inductor L1 and a coil opening of the coil conductor pattern forming the third inductor L3 overlap with each other. Similarly, a coil opening of the coil conductor pattern forming the second inductor L2 and a coil opening of the coil conductor pattern forming the fourth inductor L4 overlap with each other.

The coils forming the first inductor L1 and the third inductor L3 correspond to a first coil LA according to the present invention, and the coils forming the second inductor L2 and the fourth inductor L4 correspond to a second coil LB according to the present invention. That is, the first coil LA and the second coil LB each have a winding axis of the coil in a direction perpendicular to the surface of the substrate 1, and the winding direction of the first coil LA and the winding direction of the second coil LB have a relationship in which the direction of the magnetic flux generated in the coil opening of the first coil LA and the direction of the magnetic flux generated in the coil opening of the second coil LB are reverse when the current is applied from the RFIC-side first terminal electrode 31 to the RFIC-side second terminal electrode 32. Therefore, as indicated by a magnetic flux $\varphi 3$ in FIG. 1, a plane of the main loop of the magnetic flux interlinking the coil openings of the first coil LA and the second coil LB is parallel to the X-Z plane.

On the other hand, as further shown in FIG. 1, as indicated by a magnetic flux $\varphi 1$, the main plane of the magnetic flux loop generated around the antenna conductor pattern 61 is parallel to the Y-Z plane. Similarly, as indicated by a magnetic flux $\varphi 2$, the main plane of the magnetic flux loop generated around the antenna conductor pattern 62 is also parallel to the Y-Z plane.

Therefore, the main planes of the magnetic flux loops generated in the vicinities of the first coil LA and the second coil LB by the antenna conductor patterns 61 and 62 (e.g., magnetic fluxes $\varphi 1$ and $\varphi 2$) are orthogonal to the main planes of the magnetic flux loops generated in the first coil LA and the second coil LB (e.g., magnetic flux $\varphi 3$). Moreover, the first coil LA and the second coil LB of the impedance matching circuit are not (or minimally) unnecessarily coupled to the antenna conductor patterns 61 and 62.

Second Exemplary Embodiment

In the second exemplary embodiment, in particular, an RFID tag in which the configuration of the antenna is different from that of the example shown in the first embodiment is now described.

Figure 3A:
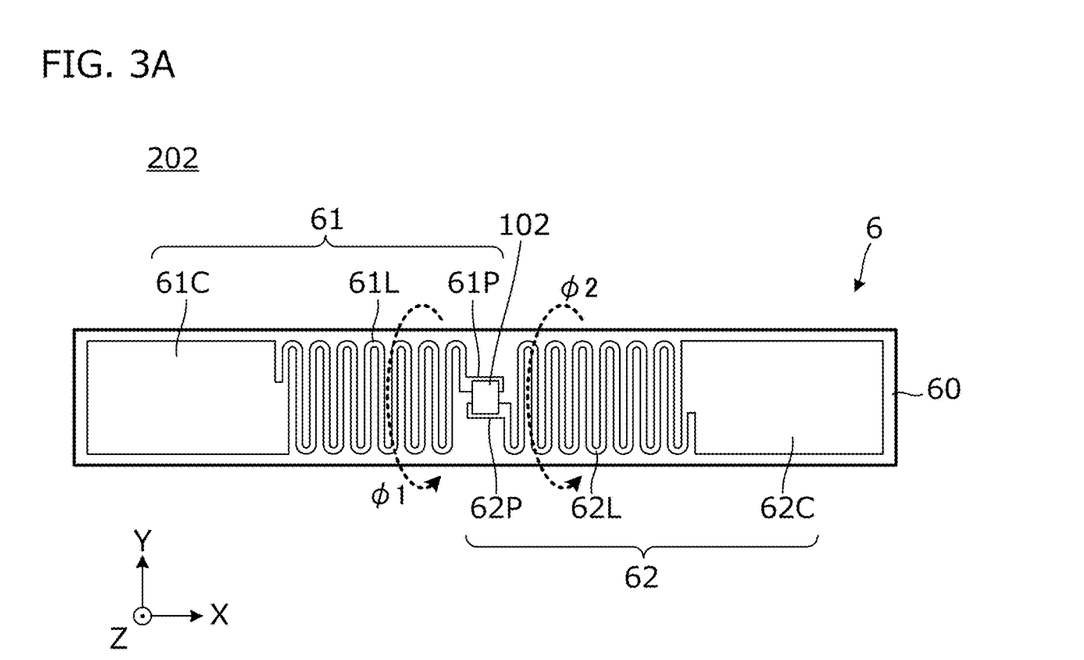
FIG. 3A is a plan view of an RFID tag 202 according to a second exemplary embodiment.
Figure 3B:
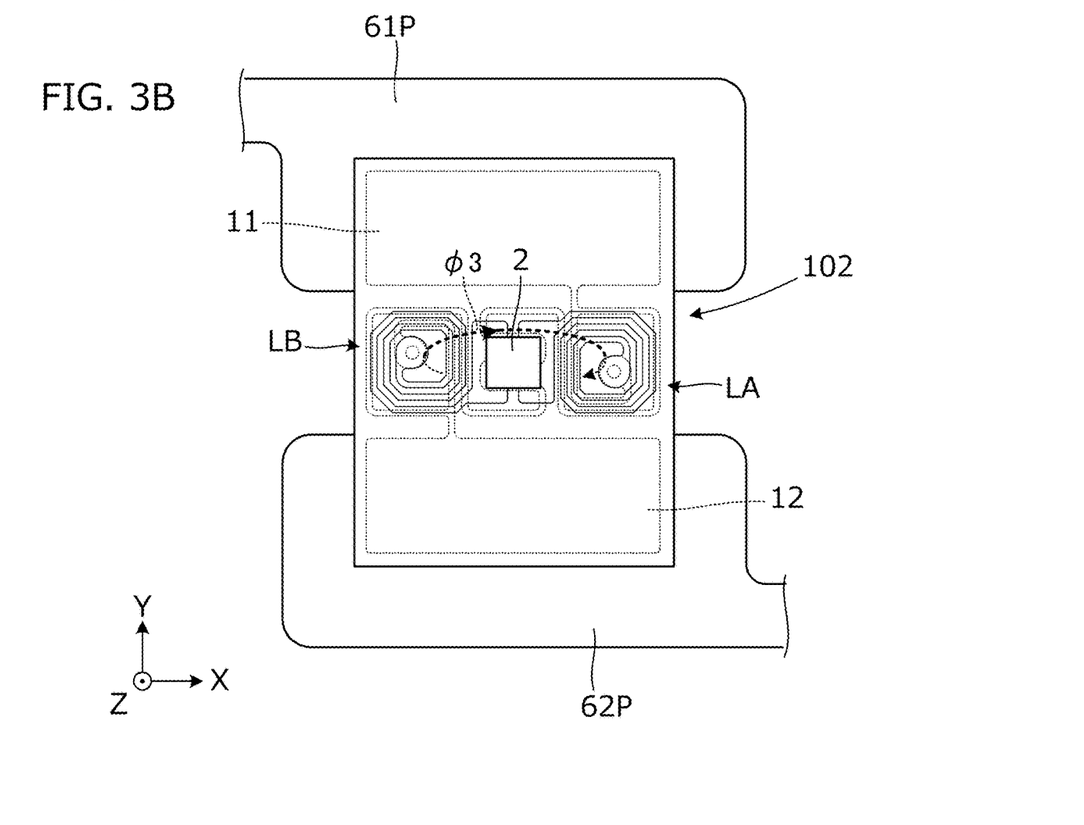
FIG. 3B is an enlarged plan view of a mounting portion of an RFIC module 102 included in the RFID tag 202.

FIG. 3A is a plan view of an RFID tag 202 according to the second exemplary embodiment. FIG. 3B is an enlarged plan view of a mounting portion of an RFIC module 102 included in the RFID tag 202.

The RFID tag 202 includes an antenna 6 and an RFIC module 102 coupled to the antenna 6. Moreover, the antenna 6 includes an insulator film 60 and antenna conductor patterns 61 and 62 formed on the insulator film 60.

As shown, the antenna conductor pattern 61 includes conductor patterns 61P, 61L, and 61C, and the antenna conductor pattern 62 similarly includes conductor patterns 62P, 62L, and 62C. The antenna conductor patterns 61 and 62 form a dipole antenna in this exemplary aspect.

In addition, the RFIC module 102 is mounted on the conductor patterns 61P and 62P. The conductor patterns 61L and 62L each have a meander line shape and act as a region having a high inductance component. In addition, the conductor patterns 61C and 62C each have a planar shape and act as a region having a high capacitance component. As a result, the formation regions of the antenna conductor patterns 61 and 62 are reduced by increasing the inductance component in the region with high current intensity and increasing the capacitance component in the region with high voltage intensity.

Figure 4:
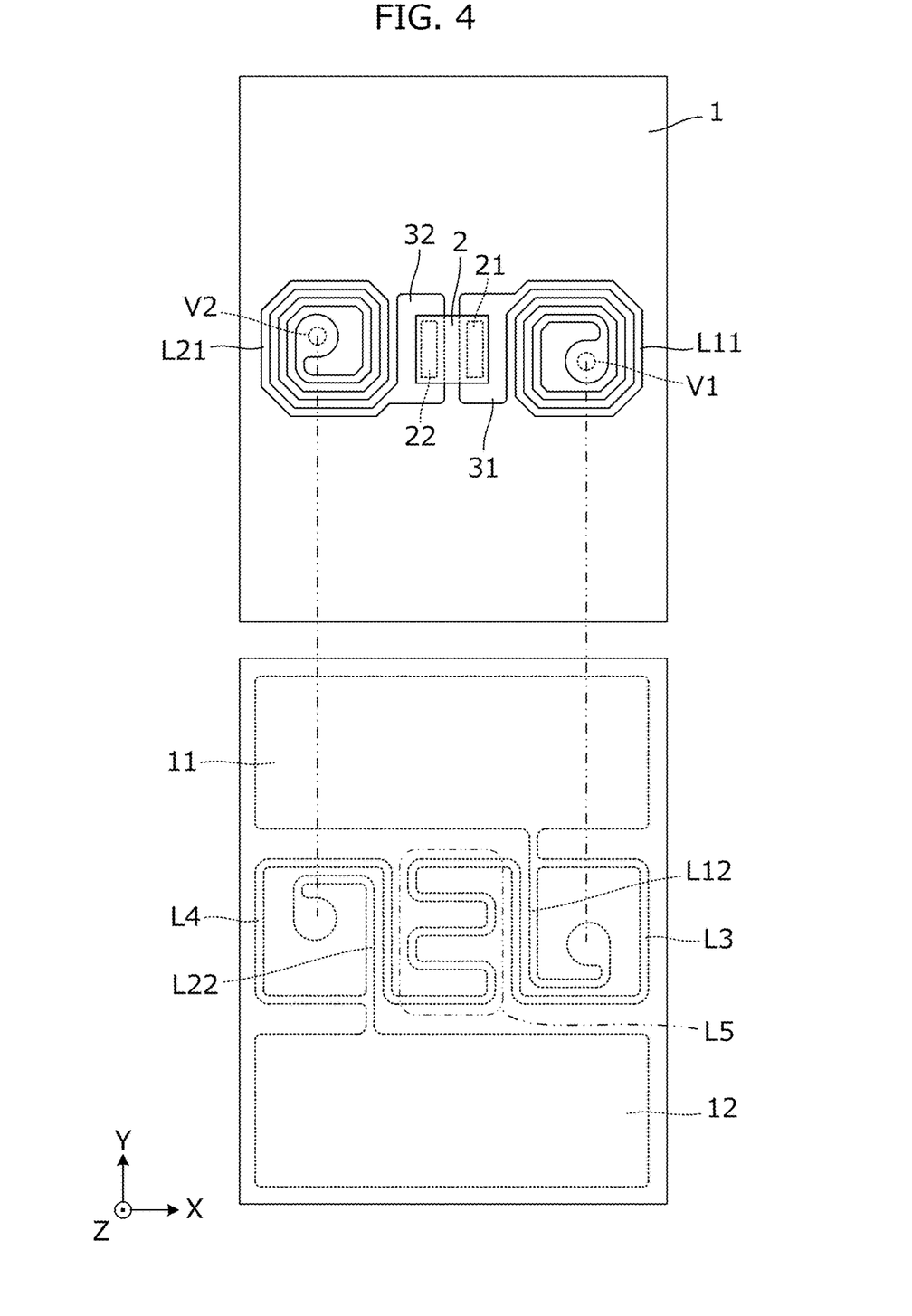
FIG. 4 is a plan view illustrating a conductor pattern formed on a substrate 1 of the RFIC module 102.

FIG. 4 is a plan view illustrating a conductor pattern formed on the substrate 1 of the RFIC module 102. As shown in FIG. 4, the upper part is a plan view of a conductor pattern formed on the upper surface of the substrate 1, and the lower part is a plan view of a conductor pattern formed on the lower surface of the substrate 1.

On the upper surface of the substrate 1, the RFIC-side first terminal electrode 31, the RFIC-side second terminal electrode 32, a conductor pattern L11 of the main part of the first inductor L1, and a conductor pattern L21 of the main part of the second inductor L2 are formed. The RFIC-side first terminal electrode 31 is connected to one end of the conductor pattern L11, and the RFIC-side second terminal electrode 32 is connected to one end of the conductor pattern L21. These conductor patterns are obtained by patterning a copper foil by photolithography, for example.

Moreover, the antenna-side first terminal electrode 11 and the antenna-side second terminal electrode 12 are formed on the lower surface of the substrate 1. On the lower surface of the substrate 1, a conductor pattern L12 of a part of the first inductor L1, a conductor pattern L22 of a part of the second inductor L2, a conductor pattern of the third inductor L3, a conductor pattern of the fourth inductor L4, and a conductor pattern of the fifth inductor L5 (i.e., the conductor patterns surrounded by two-dot chain lines) are formed. These conductor patterns are also obtained by patterning a copper foil by photolithography, for example.

An insulating layer is formed between the conductor pattern 61P and the antenna-side first terminal electrode 11, and the conductor pattern 61P and the antenna-side first terminal electrode 11 are capacitively coupled. Similarly, an insulating layer is formed between the conductor pattern 62P and the antenna-side second terminal electrode 12, and the conductor pattern 62P and the antenna-side second terminal electrode 12 are capacitively coupled.

One end of the conductor pattern L12 of a part of the first inductor L1 and one end of the conductor pattern of the third inductor L3 are connected to the antenna-side first terminal electrode 11. Similarly, one end of the conductor pattern L22 of a part of the second inductor L2 and one end of the conductor pattern of the fourth inductor L4 are connected to the antenna-side second terminal electrode 12. The conductor pattern of the fifth inductor L5 is connected between the other end of the conductor pattern of the third inductor L3 and the other end of the conductor pattern of the fourth inductor L4.

The other end of the conductor pattern of the third inductor L3 and the other end of the conductor pattern L11 of the main part of the first inductor L1 are connected via a via conductor V1. Similarly, the other end of the conductor pattern of the fourth inductor L4 and the other end of the conductor pattern L21 of the main part of the second inductor L2 are connected via a via conductor V2.

As further shown, the RFIC 2 is mounted on the RFIC-side first terminal electrode 31 and the RFIC-side second terminal electrode 32. That is, an RFIC terminal electrode 21 of the RFIC 2 is connected to the RFIC-side first terminal electrode 31, and an RFIC terminal electrode 22 of the RFIC 2 is connected to the RFIC-side second terminal electrode 32.

The first inductor L1 and the third inductor L3 are formed in different layers of the substrate 1, and are arranged in a relationship in which coil openings overlap with each other. Similarly, the second inductor L2 and the fourth inductor L4 are formed in different layers of the substrate 1, and are arranged in a relationship in which coil openings overlap with each other. The second inductor L2 and the fourth inductor L4, and the first inductor L1 and the third inductor L3 are disposed in a positional relationship of sandwiching the mounting position of the RFIC 2 along the surface of the substrate 1.

The winding direction from the RFIC-side first terminal electrode 31 to the other end of the third inductor L3 is the same as the winding direction from the RFIC-side second terminal electrode 32 to the other end of the fourth inductor L4.

It is noted that the circuit of the RFIC module 102 is the same as the circuit illustrated in FIG. 2. The first inductor L1 illustrated in FIG. 2 includes the conductor patterns L11 and L12 illustrated in FIG. 4, and the second inductor L2 includes the conductor patterns L21 and L22 illustrated in FIG. 4. The first inductor L1 is connected between the antenna-side first terminal electrode 11 and the RFIC-side first terminal electrode 31. The second inductor L2 is connected between the antenna-side second terminal electrode 12 and the RFIC-side second terminal electrode 32. One end of the third inductor L3 is connected to the antenna-side first terminal electrode 11, one end of the fourth inductor L4 is connected to the antenna-side second terminal electrode 12, and the fifth inductor L5 is connected between the other end of the third inductor L3 and the other end of the fourth inductor L4.

As illustrated in FIGS. 4 and 3B, the first coil LA includes coils forming the first inductor L1 and the third inductor L3, and the second coil LB includes coils forming the second inductor L2 and the fourth inductor L4. The direction of the magnetic flux generated in the coil opening of the first coil LA and the direction of the magnetic flux generated in the coil opening of the second coil LB are in a reverse relationship when the current is applied from the RFIC-side first terminal electrode 31 to the RFIC-side second terminal electrode 32.

As indicated by a magnetic flux $\varphi 3$ in FIG. 3B, the plane of the main loop of the magnetic flux interlinking the coil openings of the first coil LA and the second coil LB is parallel to the X-Z plane.

In the present embodiment, the antenna conductor patterns 61 and 62 have the meander line-shaped conductor patterns 61L and 62L, but the overall extending direction for each conductor pattern is the X direction illustrated in FIG. 3A. Therefore, in FIG. 3A, as indicated by a magnetic flux $\varphi 1$, the main plane of the magnetic flux loop generated around the antenna conductor pattern 61 is parallel to the Y-Z plane. Similarly, as indicated by a magnetic flux $\varphi 2$, the main plane of the magnetic flux loop generated around the antenna conductor pattern 62 is also parallel to the Y-Z plane.

Therefore, the main planes of the magnetic flux loops generated in the vicinities of the first coil LA and the second coil LB by the antenna conductor patterns 61 and 62 are orthogonal to the main planes of the magnetic flux loops generated in the first coil LA and the second coil LB. Therefore, the first coil LA and the second coil LB of the impedance matching circuit are hardly unnecessarily coupled to the antenna conductor patterns 61 and 62.

Third Exemplary Embodiment

In a third exemplary embodiment, in particular, an RFID tag in which a configuration of an antenna near an RFIC module is different from that in the first embodiment is shown.

Figure 5:
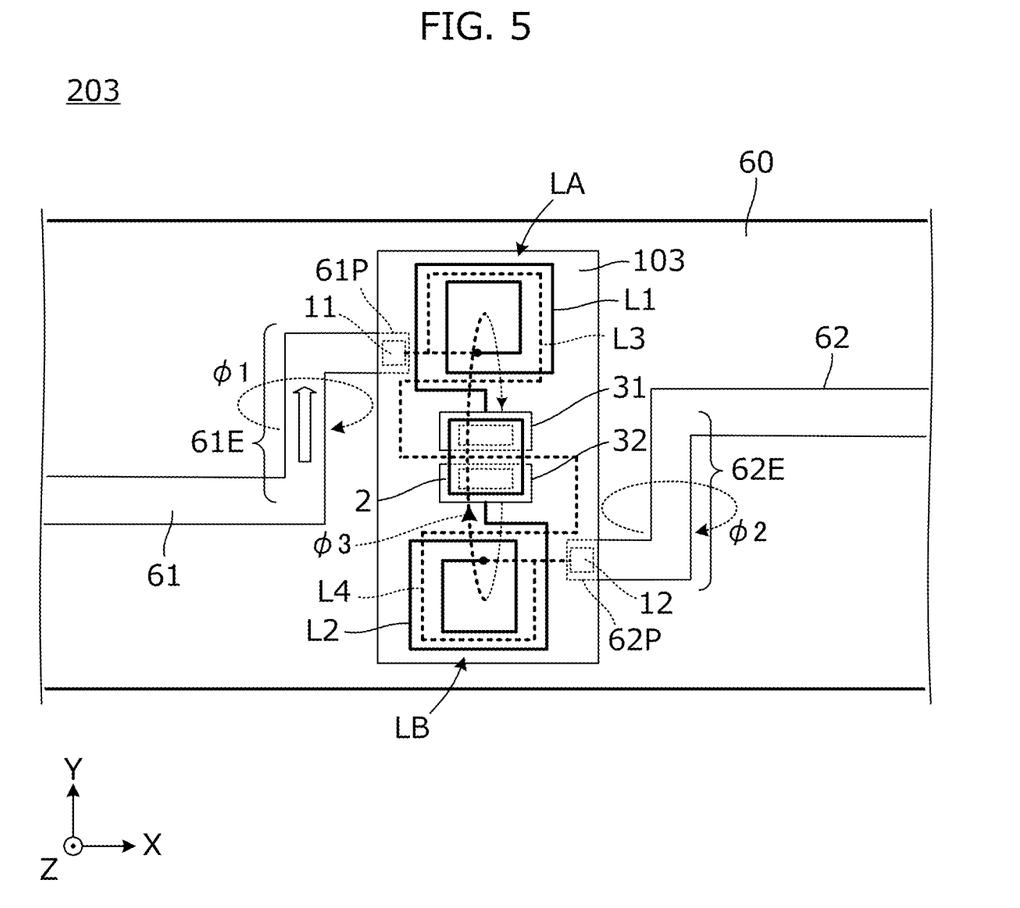
FIG. 5 is a plan view of an RFID tag 203 according to a third exemplary embodiment.

FIG. 5 is a plan view of an RFID tag 203 according to the third exemplary embodiment. As shown, the RFID tag 203 includes an insulator film 60, antenna conductor patterns 61 and 62 formed on the insulator film 60, and an RFIC module 103 mounted on the insulator film 60.

The antenna conductor patterns 61 and 62 form a dipole antenna. In FIG. 5, the vicinities of feeding units of the dipole antenna by the antenna conductor patterns 61 and 62 appear. A conductor pattern 61P is a feeding unit (e.g., a feeding end) of the antenna conductor pattern 61, and a conductor pattern 62P is a feeding unit (e.g., a feeding end) of the antenna conductor pattern 62.

The RFIC module 103 includes a substrate 1, an RFIC 2 mounted on the substrate 1, and an impedance matching circuit formed on the substrate 1 and matching impedance between the RFIC 2 and an antenna. The impedance matching circuit includes a first inductor L1, a second inductor L2, a third inductor L3, a fourth inductor L4, and a fifth inductor L5. A basic configuration of the RFIC module 103 is the same as that of the RFIC module 101 described in the first embodiment described above.

In the present embodiment, the antenna conductor pattern 61 has a drawing portion 61E extending from the conductor pattern 61P. The main direction of the drawing direction of the drawing portion 61E is a direction parallel to the Y axis. Similarly, the antenna conductor pattern 62 has a drawing portion 62E extending from the conductor pattern 62P. The main direction of the drawing direction of the drawing portion 62E is a direction parallel to the Y axis. These drawing portions 61E and 62E are portions close to the first coil LA and the second coil LB.

As indicated by a magnetic flux $\varphi 3$ in FIG. 5, the plane of the main loop of the magnetic flux interlinking the coil openings of the first coil LA and the second coil LB is parallel to the Y-Z plane. In addition, as indicated by a magnetic flux $\varphi 1$, the main plane of the magnetic flux loop generated around the drawing portion 61E in the antenna conductor pattern 61 is parallel to the X-Z plane. Similarly, as indicated by a magnetic flux $\varphi 2$, the main plane of the magnetic flux loop generated around the drawing portion 62E in the antenna conductor pattern 62 is parallel to the X-Z plane.

Therefore, the main planes of the magnetic flux loops generated in the vicinities of the first coil LA and the second coil LB by the drawing portions 61E and 62E of the antenna conductor patterns 61 and 62 are orthogonal to the main planes of the magnetic flux loops generated in the first coil LA and the second coil LB. Therefore, the first coil LA and the second coil LB of the impedance matching circuit are not (or minimally) unnecessarily coupled to the antenna conductor patterns 61 and 62.

As described in each embodiment, according to the present invention, unnecessary coupling between the antenna and the coil forming the impedance matching circuit of the RFIC module is suppressed, and the RFID tag having high independence between the RFIC module and the antenna is obtained.

Finally, it is noted that the above description of the embodiments is illustrative in all respects and not restrictive. Those skilled in the art can appropriately make modifications and changes.

For example, in any of the embodiments described above, an example has been described in which the main planes of the magnetic flux loops generated in the vicinities of the first coil LA and the second coil LB by the antenna conductor patterns 61 and 62 and the main planes of the magnetic flux loops generated in the first coil LA and the second coil LB are "orthogonal" to each other. However, when the main planes are "non-parallel" in that they intersect each other, for example, there is an effect of suppressing unnecessary coupling between the first coil LA and the second coil LB, and the antenna conductor patterns 61 and 62. That is, when the main planes of the magnetic flux loops generated in the vicinities of the first coil LA and the second coil LB and the main planes of the magnetic flux loops generated in the first coil LA and the second coil LB are orthogonal to each other, it can be said that this is a typical example in which the unnecessary coupling is most suppressed. For example, when the main planes of the magnetic flux loops generated in the vicinities of the first coil LA and the second coil LB intersect with the main planes of the magnetic flux loops generated in the first coil LA and the second coil LB within the range of the intersection angle of 90°±45°, a good effect of suppressing unnecessary coupling can be obtained.

In addition, for example, in any of the embodiments described above, an example in which the RFIC 2 is mounted on the upper surface of the substrate 1 has been described, but the RFIC 2 can be disposed inside the substrate 1 in an alternative aspect. For example, the RFIC-side first terminal electrode 31 and the RFIC-side second terminal electrode 32 can be formed in the first layer, and the RFIC 2 can be provided in the first layer. In this case, an opening (cavity) can be formed in the second layer to avoid structural interference with the RFIC 2 according to an exemplary aspect.

REFERENCE SIGNS LIST

L1 first inductor
L2 second inductor
L3 third inductor
L4 fourth inductor
L5 fifth inductor
L11, L12, L21, L22 conductor pattern
LA first coil
LB second coil
V1, V2 via conductor
1 substrate
2 RFIC
6 antenna
7 impedance matching circuit
11 antenna-side first terminal electrode
12 antenna-side second terminal electrode
21, 22 RFIC terminal electrode
31 RFIC-side first terminal electrode
32 RFIC-side second terminal electrode
60 insulator film
61, 62 antenna conductor pattern
61P, 61L, 61C, 62P, 62L, 62C conductor pattern
101, 102, 103 RFIC module
201, 202, 203 RFID tag

The invention claimed is:

1. An RFID tag comprising:
an RFIC;
an antenna; and
an impedance matching circuit connected between the RFIC and the antenna and configured to match an impedance between the RFIC and the antenna,
wherein the impedance matching circuit includes a coil, and
wherein a main plane of a magnetic flux loop generated in a vicinity of the coil by the antenna is not parallel to a main plane of a magnetic flux loop generated in the coil.

2. The RFID tag according to claim 1, further comprising:
an insulator film; and
a substrate,
wherein the antenna includes a conductor pattern disposed on the insulator film,
wherein the RFIC is mounted on the substrate, and
wherein the substrate, the impedance matching circuit, and the RFIC collectively form an RFIC module that is mounted on the insulator film.

3. The RFID tag according to claim 2, wherein the coil includes a spiral conductor pattern disposed on the substrate.

4. The RFID tag according to claim 2,
wherein the coil includes a first coil and a second coil connected in series between two terminal electrodes connected to the RFIC,
wherein each of the first and second coils have respective winding axes in a direction perpendicular to a surface of the substrate, and
wherein a direction of a magnetic flux interlinked with a coil opening of the first coil and a direction of a magnetic flux interlinked with a coil opening of the second coil are in a reverse relationship when current is applied from one of the two terminal electrodes to the other of the two terminal electrodes.

5. The RFID tag according to claim 4, wherein the surface of the substrate extends in an X-Y plane defined by an X direction and a Y direction perpendicular to the X direction, and a Z direction is orthogonal to the X-Y plane.

6. The RFID tag according to claim 5, wherein the main plane of the magnetic flux loop generated in the vicinity of the coil by the antenna is parallel to a Y-Z plane defined by the Y and Z directions, and the main plane of the magnetic flux loop generated in the coil is parallel to a X-Z plane defined by the X and Z directions.

7. The RFID tag according to claim 1, wherein the main plane of the magnetic flux loop generated in the vicinity of the coil by the antenna intersects the main plane of the magnetic flux loop generated in the coil.

8. The RFID tag according to claim 1, wherein the antenna has an open end, and the impedance matching circuit is connected to the antenna in a direct current manner or by capacitive coupling.

9. The RFID tag according to claim 1, wherein the magnetic flux loop generated by the antenna in the vicinity of the coil extends around a conductor pattern of the antenna.

10. An RFID tag comprising:
a substrate;
an RFIC mounted on the substrate;
an antenna that generates a magnetic flux loop; and
an impedance matching circuit connected between the RFIC and the antenna and configured to match an impedance between the RFIC and the antenna,
wherein the impedance matching circuit includes a coil that generates a magnetic flux loop, and
wherein a main plane of the magnetic flux loop generated by the antenna is not parallel to a main plane of the magnetic flux loop generated in the coil.

11. The RFID tag according to claim 10, further comprising an insulator film, with the antenna including a conductor pattern disposed on the insulator film.

12. The RFID tag according to claim 11, wherein the substrate, the impedance matching circuit, and the RFIC collectively form an RFIC module that is mounted on the insulator film.

13. The RFID tag according to claim 12, wherein the coil includes a spiral conductor pattern disposed on the substrate.

14. The RFID tag according to claim 12,
wherein the coil includes a first coil and a second coil connected in series between two terminal electrodes connected to the RFIC,
wherein each of the first and second coils have respective winding axes in a direction perpendicular to a surface of the substrate, and
wherein a direction of a magnetic flux interlinked with a coil opening of the first coil and a direction of a magnetic flux interlinked with a coil opening of the second coil are in a reverse relationship when current is applied from one of the two terminal electrodes to the other of the two terminal electrodes.

15. The RFID tag according to claim 10, wherein a surface of the substrate extends in an X-Y plane defined by an X direction and a Y direction perpendicular to the X direction, and a Z direction is orthogonal to the X-Y plane.

16. The RFID tag according to claim 15, wherein the main plane of the magnetic flux loop generated by the antenna is parallel to a Y-Z plane defined by the Y and Z directions, and the main plane of the magnetic flux loop generated in the coil is parallel to a X-Z plane defined by the X and Z directions.

17. The RFID tag according to claim 10, wherein the main plane of the magnetic flux loop generated by the antenna intersects the main plane of the magnetic flux loop generated in the coil.

18. The RFID tag according to claim 10, wherein the antenna has an open end, and the impedance matching circuit is connected to the antenna in a direct current manner or by capacitive coupling.

19. The RFID tag according to claim 10, wherein the magnetic flux loop generated by the antenna extends around a conductor pattern of the antenna.

20. An RFID tag comprising:
a substrate having a surface;
an RFIC mounted on the surface of the substrate;
an antenna that generates a magnetic flux loop having a main plane orthogonal to the surface of the substrate; and
an impedance matching circuit having a coil that is connected between the RFIC and the antenna,
wherein the coil of the impedance matching circuit generates a magnetic flux loop having a main plane orthogonal to the surface of the substrate, and
wherein the main plane of the magnetic flux loop generated by the antenna intersects the main plane of the magnetic flux loop generated in the coil.

* * * * *